United States Patent
Hofmann et al.

(10) Patent No.: US 10,006,309 B2
(45) Date of Patent: Jun. 26, 2018

(54) EXHAUST DIFFUSER FOR A GAS TURBINE

(71) Applicant: ANSALDO ENERGIA IP UK LIMITED, London (GB)

(72) Inventors: Willy Heinz Hofmann, Baden-Ruetihof (CH); Philipp Schaefer, Goettingen (DE)

(73) Assignee: ANSALDO ENERGIA IP UK LIMITED, London (GB)

( * ) Notice: Subject to any disclaimer, the term of this patent is extended or adjusted under 35 U.S.C. 154(b) by 236 days.

(21) Appl. No.: 14/498,201

(22) Filed: Sep. 26, 2014

(65) Prior Publication Data

US 2015/0016982 A1    Jan. 15, 2015

Related U.S. Application Data

(63) Continuation of application No. PCT/EP2013/056263, filed on Mar. 25, 2013.

(30) Foreign Application Priority Data

Mar. 30, 2012 (EP) ..................................... 12162686

(51) Int. Cl.
*F01D 25/30* (2006.01)
*F02K 1/04* (2006.01)
(Continued)

(52) U.S. Cl.
CPC ............... *F01D 25/30* (2013.01); *F01D 9/02* (2013.01); *F01D 25/28* (2013.01); *F02C 7/20* (2013.01);
(Continued)

(58) Field of Classification Search
CPC . F01D 25/30; F01D 9/02; F01D 9/041; F05B 2250/711; F05B 2250/712;
(Continued)

(56) References Cited

U.S. PATENT DOCUMENTS 2,895,667 A * 7/1959 Stalker ................. F04D 29/324
                                                          415/194
3,625,630 A * 12/1971 Soo ......................... F01D 25/30
                                                          415/199.5

(Continued)

FOREIGN PATENT DOCUMENTS

| EP | 2 159 398 A2 | 3/2010 |
| JP | 6-173707 A | 6/1994 |
| JP | 2011032900 A | 2/2011 |

OTHER PUBLICATIONS

Office Action (Communication Pursuant to Article 94(3) EPC) dated Jul. 28, 2016, by the European Patent Office in corresponding European Patent Application No. 13712242.0 (4 pages).

(Continued)

*Primary Examiner* — Jason Shanske
*Assistant Examiner* — Jesse Prager
(74) *Attorney, Agent, or Firm* — Buchanan Ingersoll & Rooney PC

(57) ABSTRACT

An exhaust diffuser for a gas turbine includes an annular duct. A row of struts is arranged in the duct. In a region downstream of the trailing edges of the struts, the cross-sectional area of the duct decreases to a local minimum and then increases again towards the outlet end of the duct. Thereby the gas flow is locally accelerated downstream of the struts. This stabilizes the boundary layer of the flow in this region and leads to a marked increase in pressure recovery for a wide range of operating conditions.

18 Claims, 5 Drawing Sheets

(51) Int. Cl.
- F01D 9/02 (2006.01)
- F01D 25/28 (2006.01)
- F02C 7/20 (2006.01)

(52) U.S. Cl.
CPC ........... *F02K 1/04* (2013.01); *F05B 2250/711* (2013.01); *F05B 2250/712* (2013.01); *F05B 2250/713* (2013.01); *F05D 2240/90* (2013.01)

(58) Field of Classification Search
CPC .......... F05B 2250/713; F05D 2250/52; F05D 2240/90; F02C 7/20; F02K 1/04; F02K 1/80
USPC ............. 415/914, 207, 220; 8/914, 207, 220
See application file for complete search history.

(56) References Cited

U.S. PATENT DOCUMENTS

| | | |
|---|---|---|
| 5,338,155 A | 8/1994 | Kreitmeier |
| 6,017,186 A | 1/2000 | Hoeger et al. |
| 8,756,936 B2 * | 6/2014 | Orosa ................... F01D 25/30 239/265.19 |
| 2010/0021291 A1 * | 1/2010 | Beeck ................... F01D 5/143 415/207 |
| 2010/0303607 A1 * | 12/2010 | Orosa ................... F01D 25/30 415/1 |
| 2011/0056179 A1 * | 3/2011 | Orosa ................... F01D 25/30 60/39.5 |
| 2011/0058939 A1 * | 3/2011 | Orosa ................. F01D 25/305 415/208.1 |
| 2011/0162339 A1 * | 7/2011 | Alexander ............. F01D 25/30 60/39.5 |

OTHER PUBLICATIONS

English Translation of Office Action (Notification of Reasons for Refusal) dated Nov. 28, 2016, by the Japanese Patent Office in corresponding Japanese Patent Application No. 2015-502272 (7 pages).

* cited by examiner

EXHAUST DIFFUSER FOR A GAS TURBINE

CROSS-REFERENCE TO RELATED APPLICATIONS

This application claims priority to PCT/EP2013/056263 filed Mar. 25, 2013, which claims priority to European application 12162686.5 filed Mar. 30, 2012, both of which are hereby incorporated in their entireties.

TECHNICAL FIELD

The present invention relates to an exhaust diffuser and to a gas turbine equipped with such an exhaust diffuser.

BACKGROUND

Exhaust diffusers are utilized in gas turbines to convert the kinetic energy of the exhaust gas at the turbine outlet into static pressure at the diffuser outlet. In the ideal case of full pressure recovery, the diffuser outlet static pressure, $P_2$, would be equal to the diffuser inlet total pressure, $P_{01}$. In reality, the diffuser outlet static pressure is lower, and the relative difference is called the exhaust loss, $$K = \frac{p_{01} - p_{02}}{p_{01} - p_1}. \quad \text{(Eq. 1)}$$

Generally speaking, the lower the exhaust loss, the higher is the diffuser performance and consequently the gas turbine power output and efficiency.

A related important parameter specifying the performance of an exhaust diffuser is the pressure recovery coefficient, $C_p$. It is defined as the ratio of the static pressure increase over the diffuser, $p_2 - p_1$, and the dynamic pressure at the diffuser inlet:

$$C_p = \frac{p_2 - p_1}{p_{01} - p_1} \quad \text{(Eq. 2)}$$

The exhaust loss and the pressure recovery coefficient depend on the diffuser geometry as well as on the inflow conditions. The inflow conditions, such as Mach number, total pressure and temperature profiles, turbulence level, and residual swirl, depend on the design and the operational conditions of the gas turbine. Increased interest in renewable energy sources has led to a requirement of more flexible gas turbines, which may be operated at multiple operating points. It is therefore desirable to provide an exhaust diffuser which achieves high pressure recovery and exhibits low exhaust loss for a wide range of operational conditions.

SUMMARY

It is an object of the present invention to provide an exhaust diffuser exhibiting a low exhaust loss and a high pressure recovery coefficient. In particular, it is an object of the present invention to provide an exhaust diffuser which is able to achieve high pressure recovery over a wide range of operating conditions.

This object is achieved by an exhaust diffuser for a gas turbine having the features of claim 1. Further embodiments of the invention are laid down in the dependent claims.

The present invention provides an exhaust diffuser for a gas turbine, comprising:
- an annular duct having an inlet end and an outlet end, the annular duct being delimited by an inner wall and by an outer wall radially surrounding the inner wall; and
- a row of first struts arranged at a first axial position in the annular duct, the first struts connecting the inner wall and the outer wall and being distributed over the circumference of the annular duct, each of the first struts having a leading edge facing the inlet end and a trailing edge facing the outlet end,
- wherein the annular duct has a cross-sectional area which decreases towards the outlet end in a region downstream of the trailing edges of the first struts to a local minimum and then increases again towards the outlet end.

By having the cross-sectional area of the annular duct locally converge downstream of the trailing edges of the first struts, gas flow is locally accelerated downstream of the first struts. This can be shown to stabilize the boundary layer of the flow in this region. Such stabilization may lead to a marked increase in pressure recovery for a wide range of operating conditions.

Directional designations are to be understood as follows: Flow is assumed to take place generally in the direction pointing from the inlet end to the outlet end of the duct. A location is "downstream" of another location if displaced from the latter in the direction of flow. A location is "upstream" of another location if displaced from the latter in a direction opposite to the direction of flow. The "leading edge" and "trailing edge" of a structure are those ends of a structure which face the inlet end and the outlet end, respectively. These ends do not necessarily form sharp edges, as might be implied by a literal interpretation of the terms "leading/trailing edge". The terms "leading/trailing edge" should rather be understood as being generally equivalent to the terms "leading/trailing end". In order to act as a diffuser, the annular duct will generally have a cross-sectional area which is larger at the outlet end than at the inlet end.

The axial location of the local minimum of the cross-sectional area should preferably be chosen neither too close nor too far away from the trailing edges of the first struts and should, generally speaking, be chosen such that the flow acceleration caused by the converging duct takes place in a region where the flow is still influenced by the first struts. The optimum axial location will generally depend on the maximum thickness of the first struts (measured along a circumferential direction of the duct). In particular, the local minimum of the cross-sectional area is preferably located at an axial distance downstream from the trailing edges of the first struts which amounts to approximately 2-10 times, preferably 3-7 times the maximum thickness of the first struts. In this range, the local convergence of the duct is believed to have its maximum stabilizing influence on the boundary layer.

The cross-sectional area should preferably be reduced at the local minimum by approximately 3-18% as compared to the cross-sectional area at the trailing edges of the first struts, more preferably by 5-15%, most preferably 8-12%. In other words, the cross-sectional area at the local minimum should preferably correspond to approximately 82-97% of the cross-sectional area at the trailing edges of the first struts, more preferably 85-95%, most preferably 88-92%.

The change of the cross-sectional area around the local minimum is preferably substantially continuous, i.e. without sudden steps, in order to avoid any destabilization of the boundary layer. In particular, the decrease of the cross-sectional area is preferably substantially continuous everywhere in the region between the trailing edges of the first struts and the local minimum. Likewise, the subsequent increase of the cross-sectional area is preferably also substantially continuous in a region extending axially downstream from the local minimum at least to a location at which the cross-sectional area of the duct again exceeds the cross-sectional area at the trailing edges of the first struts.

The local convergence of the cross-sectional area is preferably achieved by changing the radial distance between the outer wall and the inner wall. The radial distance will then decrease downstream of the trailing edges of the first struts to a local minimum of the radial distance and then increase again towards the outlet end. The axial location of the minimum of the radial distance does not necessarily coincide with the axial location of the minimum of the cross-sectional area, since the cross-sectional area is determined not only by the radial distance, but also by the circumference of the duct. In particular, the minimum of the cross-sectional area may fail to coincide with the minimum of the radial distance if the diameter of the inner wall is not constant.

Preferably, at least one, more preferably both, of the inner wall and the outer wall, in a region around the local minimum of the cross-sectional area, have an axial profile which curves away from the annular duct. The "axial profile" of each wall is to be understood as relating to a line obtained by intersecting the boundary of the respective wall which faces the duct with a half-plane containing the longitudinal axis of the duct and extending outwards radially from the longitudinal axis. This curve may be interpreted as a graph representing the absolute value of the radial distance of the respective boundary as a function of axial position. The axial profile of the outer wall is understood to "curve away from the duct" in particular if the axial profile of the outer wall (if necessary smoothed if any kinks are present in the axial profile) has a positive curvature in the mathematical sense, i.e., if the second derivative of the (if necessary smoothed) axial profile with respect to axial position is positive. The axial profile of the inner wall is understood to "curve away from the duct" in particular if the (if necessary smoothed) axial profile of the inner wall has a negative curvature in the mathematical sense, i.e., if the second derivative of the (if necessary smoothed) axial profile with respect to axial position is negative. Preferably, the axial profile of at least one of the inner wall and the outer wall curves away from the annular duct essentially everywhere in the region between the trailing edges of the first struts and the local minimum of the cross-sectional area. Likewise, the axial profile of at least one of the inner wall and the outer wall preferably curves away from the annular duct essentially everywhere in a region extending axially downstream from the local minimum at least to a location at which the cross-sectional area of the duct again exceeds the cross-sectional area at the trailing edges of the first struts.

In particular, the inner wall may have a circumference or diameter which continuously increases in a region downstream of the trailing edges of the first struts. In other words, the axial profile of the inner wall may have a positive slope in this region. In addition or in the alternative, the outer wall may have a circumference or diameter which continuously decreases in a region downstream of the trailing edges of the first struts. In other words, the axial profile of the outer wall may have a negative slope in this region.

In preferred embodiments, the radial distance between the outer and inner walls starts to converge not only downstream of the trailing edges of the first struts, but already somewhat upstream of these trailing edges, in order to avoid a strong increase in the available cross-sectional area due to the decreasing aerodynamic blockage by the first struts at the trailing edges of the first struts. If the first struts have a certain chord length between their leading edges and their trailing edges, the radial distance between the outer and inner walls preferably decreases towards the outlet end at least already along the last quarter of the chord length, more preferably at least along the last third of the chord length.

The exhaust diffuser may further comprise a row of second struts arranged at a second axial position in the annular duct, the second struts connecting the inner wall and the outer wall and being distributed over the circumference of the annular duct, each of the second struts having a leading edge facing the inlet end and a trailing edge facing the outlet end of the annular duct, the leading edges of the second struts being arranged downstream of the trailing edges of the first struts and downstream of the local minimum of the cross-sectional area. The number of second struts will usually be lower than the number of first struts and may be between 3 and 5, preferably 3, while the number of first struts will generally be between 5 and 20, in particular, about 10. In order to minimize unwanted interactions between the first struts and the second struts, the second struts should not be arranged too close to the first struts. In particular, the leading edges of the second struts are preferably arranged downstream of the local minimum of the cross-sectional area at a distance from said local minimum which is larger than the distance from the trailing edges of the first struts to said local minimum, preferably larger by a factor of at least 2.

The annular duct may be followed by a section which substantially acts as a Carnot diffuser, located axially at or downstream of the outlet end of the annular duct. Here, a "Carnot diffuser" is to be understood as a diffuser having a marked step increase in its cross-sectional area. In particular, the inner wall delimiting the annular duct may be formed by a hub structure or center body, and the outer wall may be formed by a casing. The section acting as a Carnot diffuser may then be located at the trailing edge of the hub structure and may be radially delimited by the casing. In particular, the hub structure may have a blunt end rather than a tail cone, and the outer wall may have a step increase in diameter at or around the axial location of the trailing edge of the hub structure.

The present invention further relates to the use of the above-described exhaust diffuser in a gas turbine and to a gas turbine comprising such an exhaust diffuser. A gas turbine generally comprises at least a compressor section, a combustor section and a turbine section, followed by the exhaust diffuser. The compressor section can act to induct ambient air and to compress it. The combustor section can receive the compressed air along with a fuel to burn the fuel and to form a hot working gas which in turn can then be expanded in the turbine section to drive a turbine rotor. The exhaust diffuser can then receive the expanded working gas from the turbine section.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DETAILED DESCRIPTION

Figure 1:
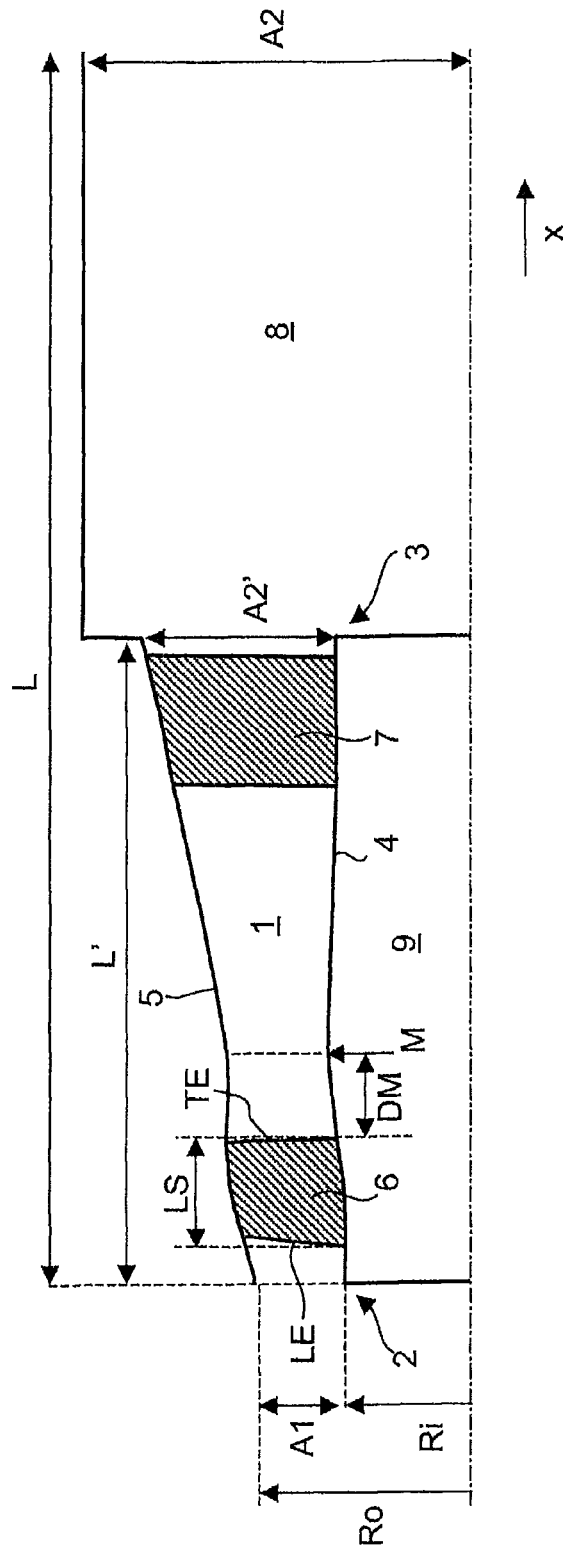
FIG. 1 shows a schematic diagram illustrating the geometry of an exhaust diffuser according to the present invention.

FIG. 1 illustrates, in a longitudinal section along a half-plane containing the longitudinal axis and extending out radially, the geometry of an illustrative example of an exhaust diffuser according to the present invention. The diffuser comprises an annular divergent channel or duct 1 extending from an inlet end 2 to an outlet end 3 and having a length L'. The duct 1 is delimited by a rotationally symmetric inner wall 4 formed by a central hub 9 and a rotationally symmetric outer wall 5 formed by a casing. Two rows of struts 6, 7 are arranged at different axial locations in the duct, supporting the central hub 9. The first row consists of ten struts, and the second row consists of three struts, the struts of each row being distributed equally about the circumference of the duct. Each strut of the first row (in the following called the "first struts") has a chord length LS between its leading edge LE and its trailing edge TE.

The annular duct 1 is followed at its outlet end by an attached Carnot diffuser 8. The Carnot diffuser 8 exhibits a two-sided backward-facing step formed, on the one hand, by the end of the hub 9 and, on the other hand, by a step-like increase of the diameter of the outer wall 5, followed by a cylindrical section delimited only by the outer wall 5.

The diffuser may be characterized, inter alia, by the following further parameters: overall length, L; inner radius of duct at inlet end, Ri; outer radius of duct at inlet end, Ro; cross-sectional area at inlet end, A1; cross-sectional area at outlet end, A2; and cross-sectional area at outlet of annular duct, A2'.

Downstream from the trailing edges TE of the first struts 6, the cross-sectional area of the annular duct 1 decreases to a local minimum M before increasing again towards the outlet end 3. In the present example, both the decrease and increase of the cross-sectional area are continuous, i.e. without substantial steps, and smooth, i.e. without sharp kinks. The local minimum M is located at an axial distance DM from the trailing edges TE of the first struts 6. In the present example, the distance DM corresponds to approximately five times the maximum thickness of the first struts, measured along the circumferential direction of the annular duct. In the present example, both the inner wall 4 and the outer wall 5 have an axial profile which curves away from the annular duct in the vicinity of the local minimum M. Expressed mathematically, the axial profile of the inner wall 4, representing a graph of the radius of the inner wall 4 as a function of axial position x, has a second derivative with respect to x which is negative near the local minimum M. Likewise, the axial profile of the outer wall 5 has a second derivative with respect to x which is positive near the local minimum M. Furthermore, in the present example the radius of the inner wall 4 continuously increases downstream of the trailing edges TE towards the local minimum M, and the radius of the outer wall 5 continuously decreases downstream of the trailing edges TE towards the local minimum. In other words, both the inner wall and the outer wall contribute to the formation of the local minimum M.

The second row of struts 7 (in the following referred to as "second struts") is located at a comparatively large axial distance from the first struts. In particular, in the present example, the distance between the leading edges of the second struts 7 and the local minimum M is larger than the distance between the local minimum M and the trailing edges TE of the first struts 6 by approximately a factor of three. In this manner, any interaction between the first struts and the second struts is minimized.

The convergence of the cross-sectional area can be achieved by manufacturing the hub body and the casing accordingly. It is also conceivable to provide inserts for an existing duct geometry not exhibiting convergence, in order to achieve the desired convergence.

Figure 2:
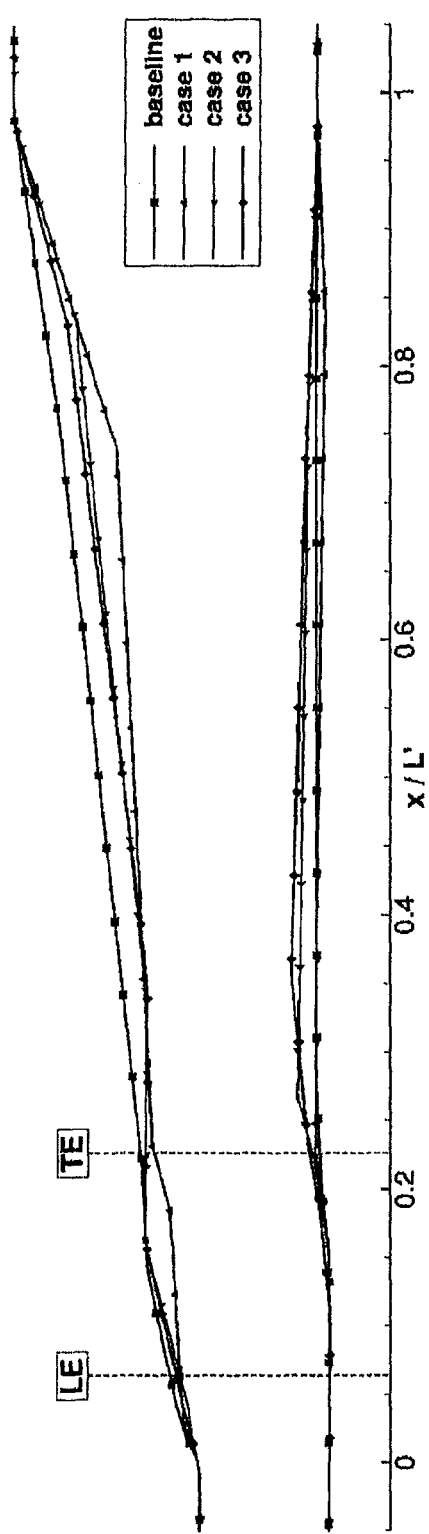
FIG. 2 shows four different examples of wall contours of an annular duct, referred to as "baseline", "case 1", "case 2" and "case 3"

The geometry of an exhaust diffuser having a general setup similar to that of FIG. 1 was optimized numerically, starting from a reference diffuser which does not exhibit the local minimum M (in the following referred to as the "baseline" case). The optimizations resulted in diffusers with different duct geometry and differently shaped first struts (in the following referred to as "case 2"). The performance of these diffusers was compared to the performance of the baseline diffuser. FIG. 2 illustrates the axial profiles of the inner wall and the outer wall for the duct geometries of the baseline case and cases 1-3. In the baseline case, the hub contour (i.e. the contour of the inner wall) is nearly a straight line, while the tip contour (i.e. the contour of the outer wall) is bell-shaped, which is known to outperform a conical shape. The geometries of cases 1, 2 and 3 will be discussed further below.

Figure 3:
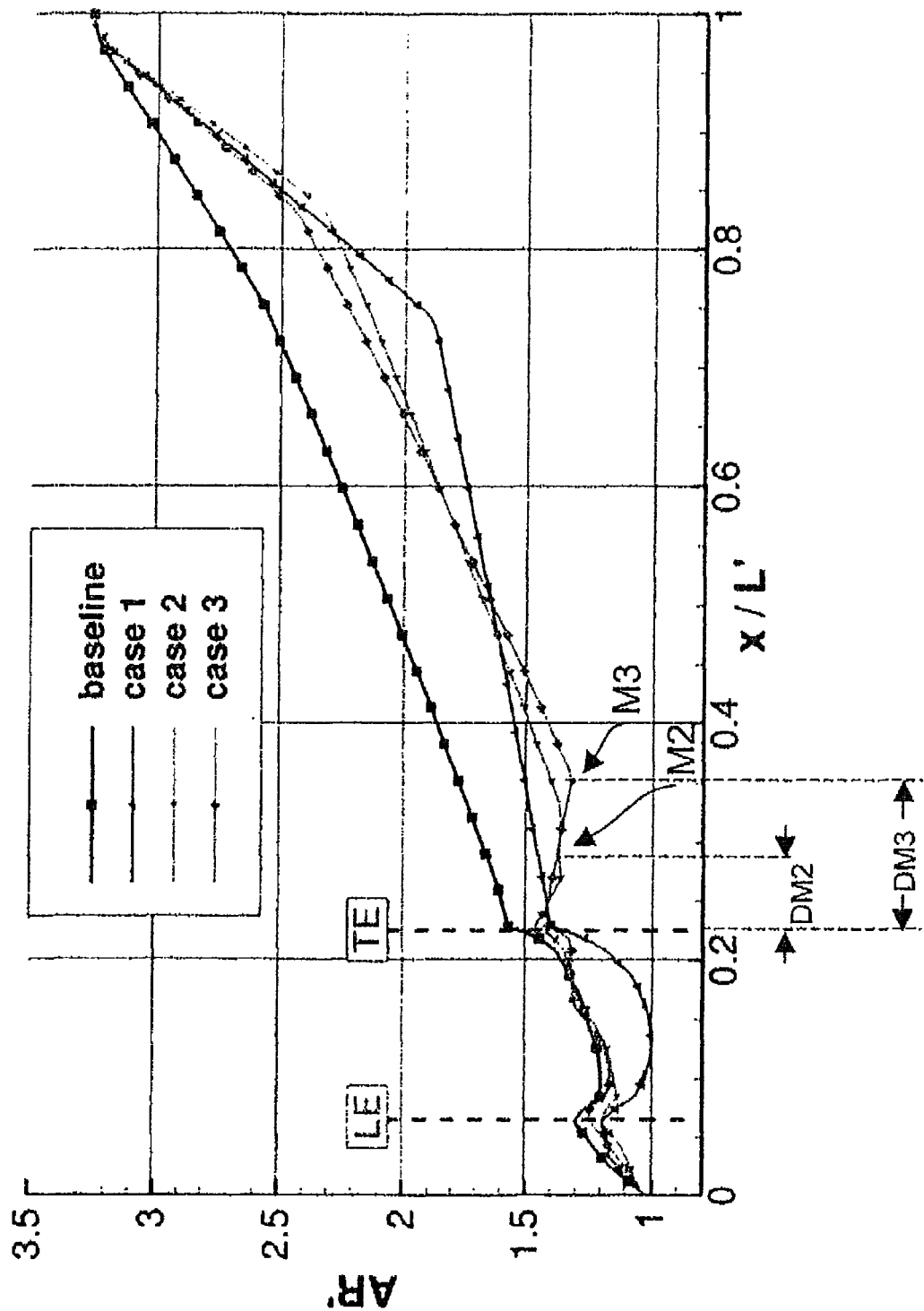
FIG. 3 shows a diagram illustrating the area ratio for the four examples of wall contours of FIG. 2.

FIG. 3 shows the variation of the area ratio AR' within the duct, i.e. the ratio of the cross-sectional area at a given axial position x as compared to the cross-sectional area A1 at the inlet of the duct, for the baseline case and cases 1-3, taking the presence of the first struts into account. In the baseline case, the area ratio exhibits a marked decrease near the leading edge of the struts due to the flow blockage caused by the struts, followed by a relatively sharp increase near the trailing edge of struts. The area ratio then continuously increases between the trailing edge of the struts and the outlet of the duct. The area ratio of cases 1, 2 and 3 will be discussed further below.

Figure 4:
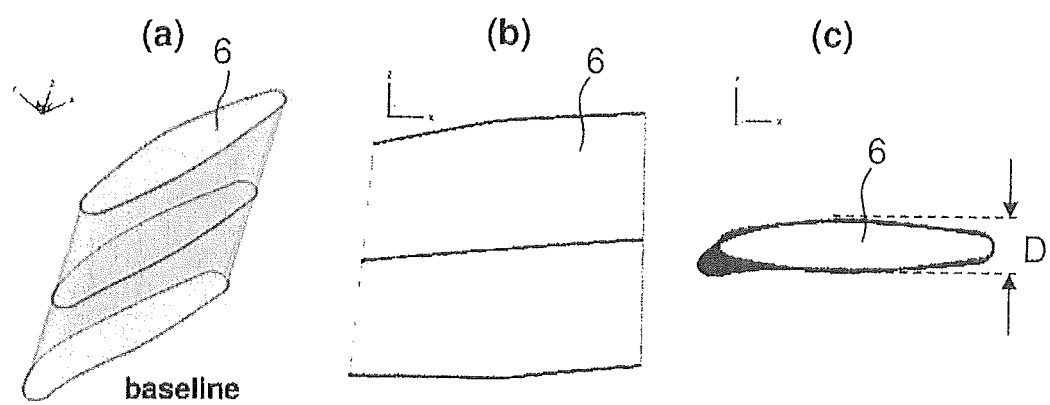
FIG. 4 shows various views illustrating an example of a strut geometry employed together with the wall contours of FIG. 2, relating to the "baseline" case, part (a) illustrates the construction profile, part (b) is a side view and part (c) is a top view of a strut.

FIG. 4 illustrates the baseline strut geometry, illustrated in parts (a) to (c). This geometry was obtained by an earlier optimization, which did not take interactions between the duct geometry and the strut geometry into account. The baseline strut geometry is nearly symmetric at the tip (at the outer wall) while exhibiting a slight bend at the hub (at the inner wall).

Figure 5:
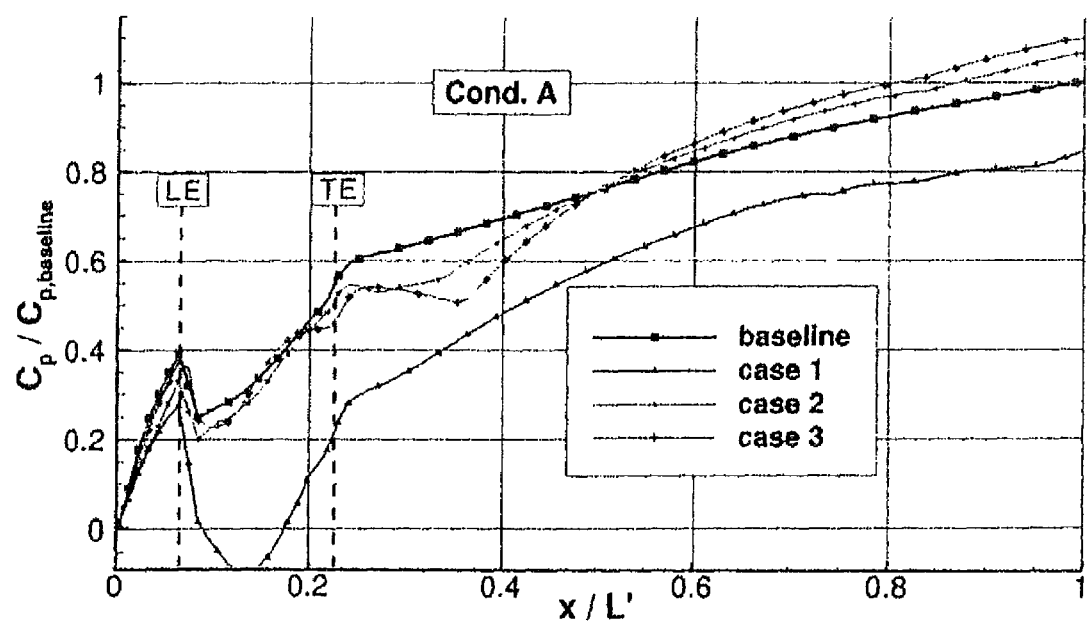
FIG. 5 shows a comparison of the numerical pressure recovery for four examples of an annular diffuser.

FIG. 5 shows the resulting performance of different duct geometries of cases 1-3, as illustrated in FIGS. 2 and 3.

The invention claimed is:

1. An exhaust diffuser for a gas turbine, the exhaust diffuser comprising:
   an annular duct having an inlet end and an outlet end, the annular duct being delimited by an inner wall and by an outer wall radially surrounding the inner wall;
   a row of first struts arranged at a first axial position in the annular duct, the first struts connecting the inner wall and the outer wall and being distributed over the circumference of the annular duct, each of the first struts having a leading edge facing the inlet end and a trailing edge facing the outlet end, wherein the annular duct has a cross-sectional area which decreases towards the outlet end in a region downstream of the trailing edges of the first struts to a local minimum and then increases again towards the outlet end; and a row of second struts arranged at a second axial position in the annular duct, the second struts connecting the inner wall and the outer wall and being distributed over the circumference of the annular duct, each of the second struts having a leading edge facing the inlet end and a trailing edge facing the outlet end of the annular duct, the leading edges of the second struts being arranged downstream of the trailing edges of the first struts and downstream of the local minimum of the cross-sectional area, and wherein the leading edges of the second struts are arranged downstream of the local minimum of the cross-sectional area at a distance from said local minimum which is larger by a factor of at least 3 than the distance from the trailing edges of the first struts to said local minimum, and wherein the outer wall has a circumference, which decreases in a region downstream of the trailing edges of the first struts to the local minimum and continuously increases in a region downstream of the local minimum to the leading edge of the second struts.

2. The exhaust diffuser of claim 1, wherein each of the first struts has a maximum thickness in a circumferential direction, and wherein the local minimum of the cross-sectional area is located at an axial distance downstream from the trailing edges of the first struts, the axial distance amounting to between 2 and 10 times the maximum thickness of the first struts.

3. The exhaust diffuser of claim 1, wherein the cross-sectional area at its local minimum amounts to 82% to 97% of the cross-sectional area at the trailing edges of the first struts.

4. The exhaust diffuser of claim 1, wherein the inner wall and the outer wall are separated by a radial distance which decreases in a region downstream of the trailing edges of the first struts to a local minimum of the radial distance and then increases again towards the outlet end.

5. The exhaust diffuser of claim 1, wherein at least one of the inner wall and the outer wall, in a region around the local minimum of the cross-sectional area, has an axial profile which is convex away from the annular duct.

6. The exhaust diffuser of claim 5, wherein both the inner wall and the outer wall, in a region around the local minimum of the cross-sectional area, have an axial profile which is convex away from the annular duct.

7. The exhaust diffuser of claim 1, wherein the inner wall has a circumference which increases in a region downstream of the trailing edges of the first struts.

8. The exhaust diffuser of claim 1, wherein the first struts have a strut length between the leading edge and the trailing edge, and wherein the outer wall and the inner wall are separated by a radial distance which decreases towards the outlet end between the leading edge and the trailing edge of the first struts at least along a last quarter of the strut length.

9. The exhaust diffuser of claim 1, further comprising a section which acts as a Carnot diffuser, said section being located axially downstream of the outlet end of the annular duct.

10. The exhaust diffuser of claim 9, wherein the inner wall is formed by a hub structure and the outer wall is formed by a casing, and wherein the section which acts as a Carnot diffuser is located axially downstream of the hub structure and is radially delimited by the casing.

11. A gas turbine comprising the exhaust diffuser of claim 1.

12. The exhaust diffuser of claim 1, wherein the cross-sectional area at the local minimum amounts to 85% to 95% of the cross-sectional area at the trailing edges of the first struts.

13. The exhaust diffuser of claim 1, wherein the cross-sectional area at the local minimum amounts to 88% to 92% of the cross-sectional area at the trailing edges of the first struts.

14. The exhaust diffuser of claim 1, wherein a number of second struts is less than a number of first struts.

15. The exhaust diffuser of claim 14, wherein the number of second struts is 3 to 5 and the number of first struts is 5 to 20.

16. The exhaust diffuser of claim 15, wherein the number of second struts is 3 and the number of first struts is 10.

17. The exhaust diffuser of claim 1, wherein the inner wall has a circumference, which increases in a region downstream of the trailing edges of the first struts to the local minimum and decreases in a region downstream of the local minimum to the leading edge of the second struts.

18. The exhaust diffuser of claim 1, wherein the inner wall has a circumference, which increases in a region downstream of the trailing edges of the first struts to the local minimum and continuously decreases in a region downstream of the local minimum to the leading edge of the second struts.

* * * * *